United States Patent
Ami et al.

(10) Patent No.: US 7,001,094 B2
(45) Date of Patent: Feb. 21, 2006

(54) WRITING UTENSIL HAVING EXCELLENT CAP-OFF PERFORMANCE

(75) Inventors: Kazuhiro Ami, Takasaki (JP); Tatsuya Mizoguchi, Fujioka (JP); Takahiro Osada, Tamamura-machi (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/416,183

(22) PCT Filed: Nov. 8, 2001

(86) PCT No.: PCT/JP01/09794

§ 371 (c)(1),
(2), (4) Date: May 9, 2003

(87) PCT Pub. No.: WO02/38394

PCT Pub. Date: May 16, 2002

(65) Prior Publication Data

US 2004/0028462 A1   Feb. 12, 2004

(30) Foreign Application Priority Data

| Nov. 9, 2000 | (JP) | ............................. 2000-342302 |
| Nov. 9, 2000 | (JP) | ............................. 2000-342303 |
| Oct. 10, 2001 | (JP) | ............................. 2001-312783 |

(51) Int. Cl.
   *B43K 5/00* (2006.01)
(52) U.S. Cl. ........................................ 401/199; 401/198
(58) Field of Classification Search ................ 401/196, 401/198, 199, 205, 221, 222, 231; 106/31.29, 106/31.38, 31.86
See application file for complete search history.

(56) References Cited

U.S. PATENT DOCUMENTS

| 3,881,828 A | | 5/1975 | Jones |
| 4,545,818 A | * | 10/1985 | Inoue et al. ............. 106/31.38 |
| 4,838,723 A | | 6/1989 | Suzuki et al. |
| 5,013,361 A | | 5/1991 | Case, et al. |
| 5,763,525 A | | 6/1998 | Abber et al. |
| 5,961,703 A | * | 10/1999 | Fraas ....................... 106/31.29 |
| 6,474,893 B1 | * | 11/2002 | Osada et al. ................ 401/198 |

FOREIGN PATENT DOCUMENTS

| JP | 62-9437 B2 | 2/1987 |
| JP | 62-34352 B2 | 7/1987 |
| JP | 63-178177 A | 7/1988 |
| JP | 1-35028 B2 | 7/1989 |
| JP | 2-232277 A | 9/1990 |
| JP | 2594457 B2 | 12/1996 |
| JP | 11-335612 A | 12/1999 |
| WO | WO 97/16499 | 5/1997 |
| WO | WO 00/37265 A1 | 6/2000 |

OTHER PUBLICATIONS

Non-official English translation of JP11-335612A.*

* cited by examiner

*Primary Examiner*—Tuan Nguyen
(74) *Attorney, Agent, or Firm*—Buchanan Ingersoll PC (57) ABSTRACT

Provided is a writing instrument in which a pen tip comprising a fibrous feed or a plastic feed is coated with a coating agent comprising a substance providing a cap-off property, wherein a fluorine base surfactant and/or a silicone base surfactant are added to an ink for the above writing instrument, and/or a substance which is solid at room temperature and has a solubility of 5% or less in an ink solvent at room temperature and which has a polar functional group is added to the coating agent, whereby the writing instrument having an excellent cap-off performance can be obtained.

9 Claims, 3 Drawing Sheets

FIG. 1

(Prior Art)

FIG. 2

(Prior Art)

FIG. 3

(Prior Art)

WRITING UTENSIL HAVING EXCELLENT CAP-OFF PERFORMANCE

TECHNICAL FIELD

The present invention relates to a writing instrument having an excellent cap-off performance which has a good writing performance even after the pen tip is left to stand in the air for a long period of time.

BACKGROUND ART

Writing instruments in which inks are penetrated into pen tips comprising a fibrous feed or a plastic feed as is the case with a marking pen, a felt-tip pen and a writing brush pen-have so far been used in many cases.

However, when a cap is taken away to leave a pen tip part to stand in the air for a long time, there involved is the problem in that the pen tip part is dried to cause inferior writing.

In the past, in writing instruments such as a marking pen, a ballpoint pen, a felt-tip pen and a writing brush pen which are excellent in a cap-off performance of inhibiting drying at the pen tips, higher fatty acid esters of polyglycerin were added to inks (Japanese Patent Publication S62-34352/1987); paraffin waxes which can be deposited on the surface of a pen tip to form a thin film were added to inks (Japanese Patent Publication H01-35028/1989); hexaglyceryl tristearate was added to inks (Japanese Patent Application Laid-Open No. H02-232277/1990); and lecithin was added to inks (Japanese Patent No. 2594457).

However, many of additives having a high vaporization-inhibiting effect have a low solubility (10% by weight or less) in ink solvents and has a problem in terms of this low solubility. In particular, the solubility in the vicinity of 0° C. is low (5% by weight or less), whereby there involved are the problems in that precipitations of the additives are produced in the inks while pens are stored at a low temperature or exposed repeatedly to low and high temperatures, thereby causing clogging in the ink passages to reduce the writing property or deteriorating the cap-off property with the passage of time. Thus, the effective vaporization-inhibiting effect is not yet achieved.

Accordingly, the present inventors have filed a patent application for writing instruments such as a marking pen, a felt-tip pen and a writing brush pen having an excellent cap-off performance in which a pen tip comprising a fibrous feed or a plastic feed is coated with a substance such as paraffin wax providing a cap-off property (PCT Publication WO2000/37265).

A substance such as paraffin wax providing a cap-off property has an excellent effect, but paraffin wax has a low critical surface tension, so that the ink is a little deteriorated in a wetting property with respect to the pen tip to cause the problem of reduction in the ink discharge amount. Further, there involved are the problems in that it takes time until the pen tip is filled with the ink and that starving is slightly brought about.

In light of the problems on the conventional techniques described above, the present invention intends to solve them, and an object thereof is to provide a writing instrument having an excellent cap-off performance in which a pen tip is quickly filled with an ink and starving is not caused and which has a stable ink discharge amount and provides a good writing performance even after the pen tip is left to stand in the air over a long period of time.

DISCLOSURE OF THE INVENTION

Intensive investigations of the problems on the conventional techniques described above, to be specific, those from the viewpoints of ink components and a composition of a coating agent repeated by the present inventors have resulted in finding that in a writing instrument in which a pen tip comprising a fibrous feed or a plastic feed is coated with a coating agent comprising a substance providing a cap-off property, a wetting property of an ink with respect to the pen tip is improved by adding a specific surfactant to an ink and/or adding a specific component to the coating agent, whereby a writing instrument such as a marking pen, a felt-tip pen and a writing brush pen each having an excellent cap-off performance is obtained, and thus the present invention has come to be completed.

That is, the present invention comprises the following items (1) to (4).

(1) A writing instrument having an excellent cap-off performance in which a pen tip comprising a fibrous feed or a plastic feed is coated with a coating agent comprising a substance providing a cap-off property, wherein an ink for the above writing instrument contains a fluorine base surfactant and/or a silicone base surfactant.

(2) A writing instrument having an excellent cap-off performance in which a pen tip comprising a fibrous feed or a plastic feed is coated with a coating agent comprising a substance providing a cap-off property, wherein the above coating agent contains a substance which is solid at room temperature and has a solubility of 5% or less in an ink solvent at room temperature and which has a polar functional group.

(3) The writing instrument having an excellent cap-off performance as described in the above item (2), wherein an ink for the above writing instrument contains a fluorine base surfactant and/or a silicone base surfactant.

(4) The writing instrument having an excellent cap-off performance as described in the above item (2) or (3), wherein the substance having a polar functional group described above is at least one selected from the group consisting of oxidized paraffin, urethane type waxes and alcohol type waxes each having a polar functional group.

(5) The writing instrument having an excellent cap-off performance as described in any of the above items (2) to (4), wherein the substance having a polar functional group described above has a content of 0.01% by weight or more based on the total amount of the coating agent.

According to the present invention, provided is a writing instrument having an excellent cap-off performance which provides a good writing performance even after the pen tip is left to stand in the air for a long period of time.

BEST MODE FOR CARRYING OUT THE INVENTION

The embodiments of the present invention shall be explained below in details according to each and every invention.

The writing instrument having an excellent cap-off performance, which is the first invention of the present invention is a writing instrument in which a pen tip comprising a fibrous feed or a plastic feed is coated with a coating agent comprising a substance providing a cap-off property, wherein an ink for the above writing instrument contains a fluorine base surfactant and/or a silicone base surfactant.

The second invention of the present invention is a writing instrument having an excellent cap-off performance in which a pen tip comprising a fibrous feed or a plastic feed is coated with a coating agent comprising a substance providing a cap-off property, wherein the above coating agent contains a substance which is solid at room temperature and has a solubility of 5% or less in an ink solvent at room temperature and which has a polar functional group.

When the "present invention" is referred to hereinafter, it involves the first invention and the second invention each described above.

Figure 1:
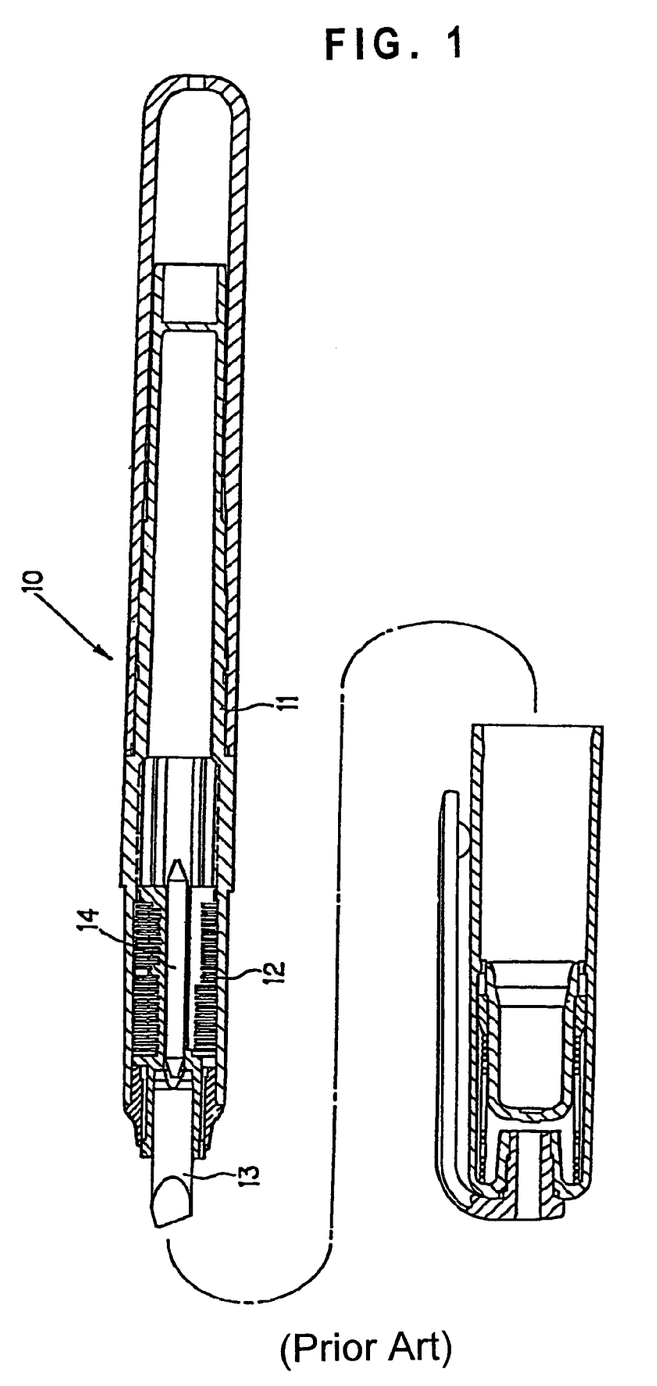
FIG. 1 is an illustrative drawing showing, in a cross sectional mode, one example in which the writing instrument of the present invention is applied to a free ink type writing instrument.
Figure 2:
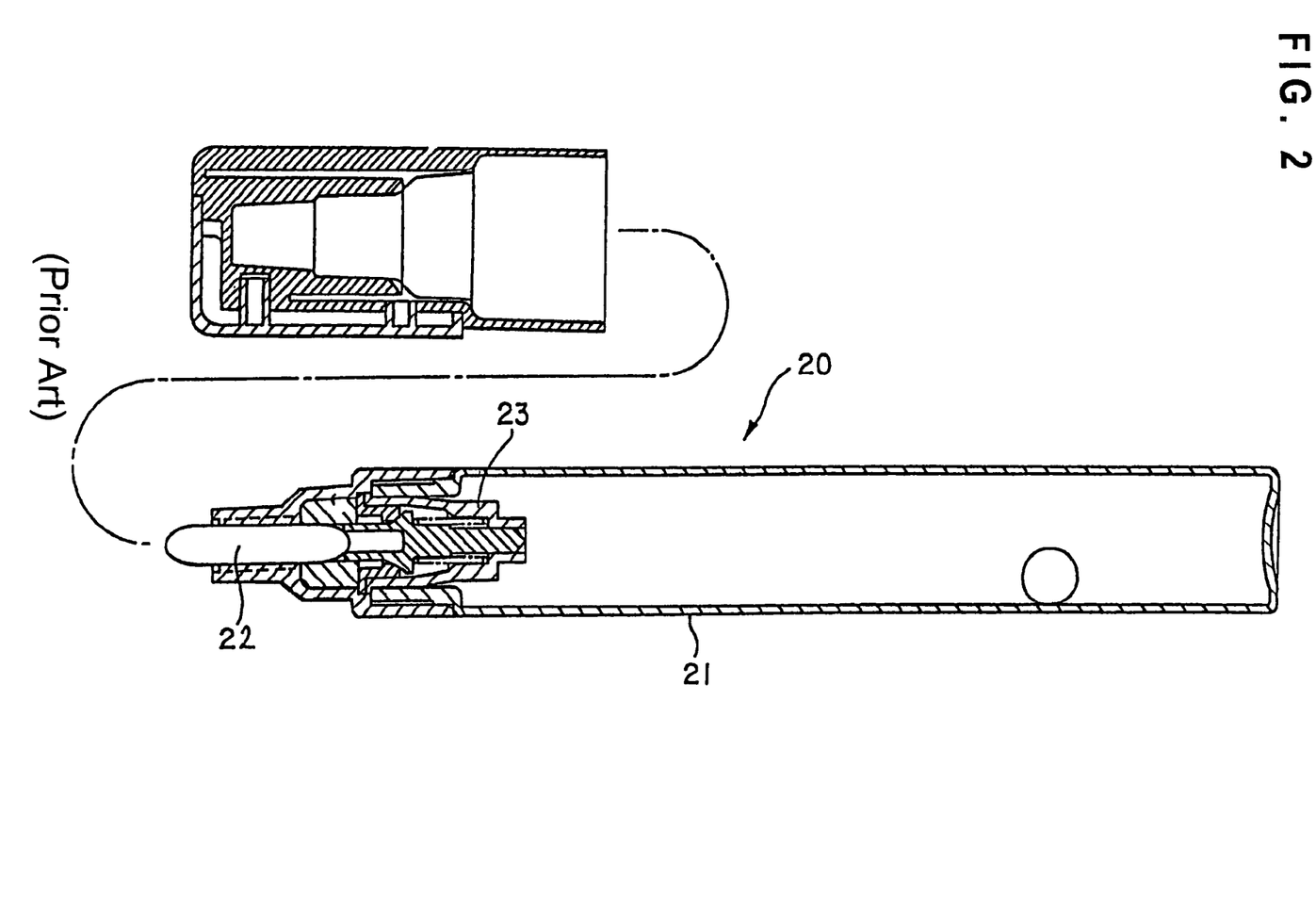
FIG. 2 is an illustrative drawing showing, in a cross sectional mode, one example in which the writing instrument of the present invention is applied to a writing instrument equipped with a valve mechanism.
Figure 3:
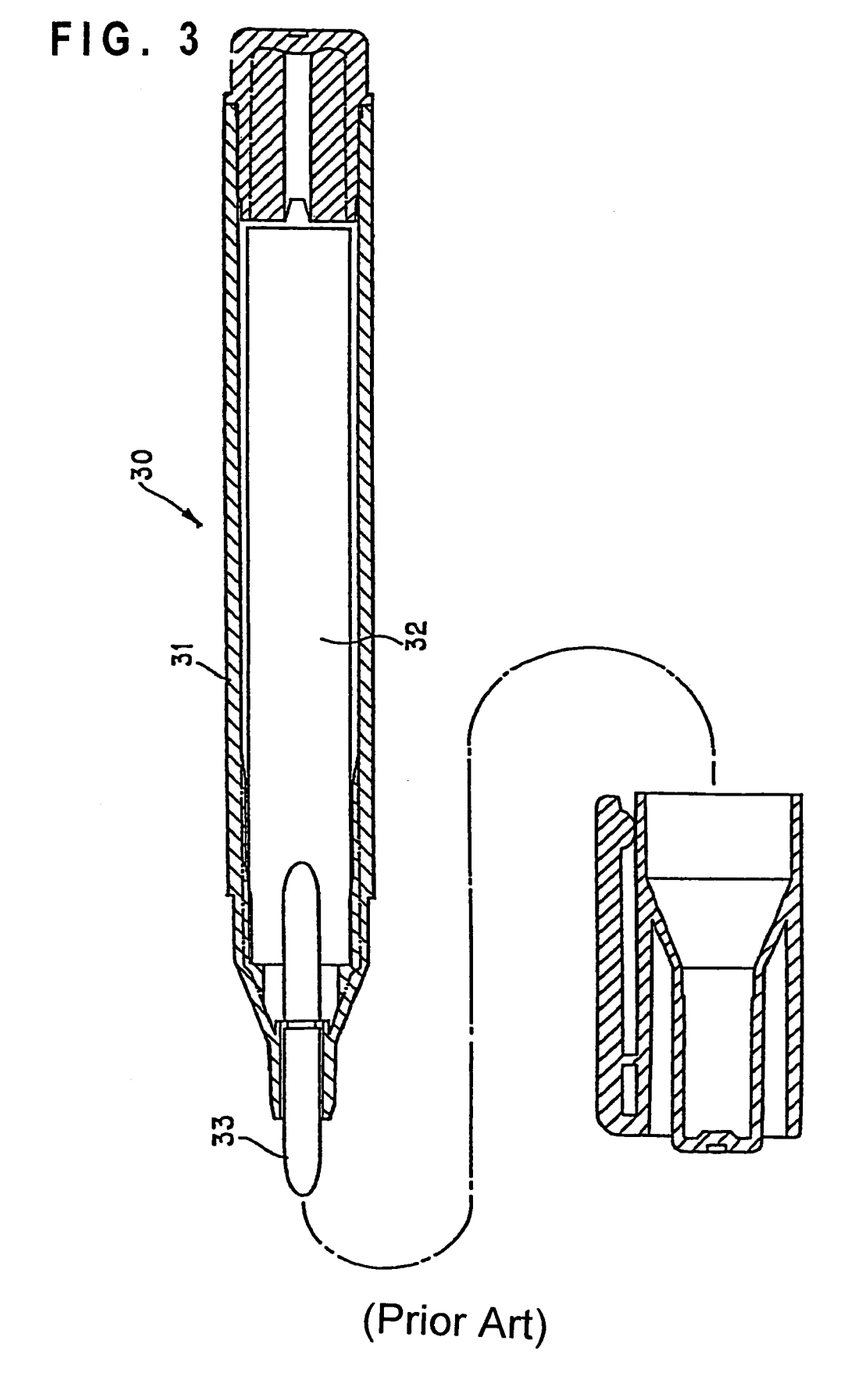
FIG. 3 is an illustrative drawing showing, in a cross sectional mode, one example of a type in which an ink is occluded in an ink reservoir such as a sliver in the writing instrument of the present invention.

The writing instrument in the present invention (the first invention and the second invention) shall not specifically be restricted as long as it is a writing instrument having a pen tip comprising a fibrous feed or a plastic feed, and it includes, for example, (1) as shown in FIG. 1, a free ink type writing instrument 10 which has a barrel to be an ink tank part 11 for directly storing an ink and a collector member 12 for temporarily holding the ink and in which the ink is introduced from the ink tank part 11 into a pen tip 13 via a feed 14 (or directly), (2) as shown in FIG. 2, a writing instrument 20 which has a barrel to be an ink tank part 21 for directly storing an ink and in which an ink is introduced from the ink tank part 21 into a pen tip 22 via a valve mechanism part 23 directly (or via a feed) and (3) as shown in FIG. 3, a writing instrument 30 which has an ink reservoir 32 occluding an ink in a barrel 31 and in which the ink is introduced from the above ink reservoir 32 into a pen tip 33 directly (or via a feed).

In the present invention, a material, a structure and a production method of the pen tip comprising a fibrous feed or a plastic feed shall not specifically be restricted and include, for example, pen tips comprising fibrous feeds comprising parallel fiber bundles comprising one or a combination of two or more kinds of natural fibers, animal hair fibers, polyacetal base resins, acryl base resins, polyester base resins, polyamide base resins, polyurethane base resins, polyolefin base resins, polyvinyl base resins, polycarbonate base resins, polyether base resins and polyphenylene base resins; fiber feeds of felt and the like prepared by processing fibrous bundles; or fiber feeds prepared by processing fibrous bundles with resins; plastic feeds comprising the various plastic materials described above and having grooves for ink in an axial direction; and porous bodies obtained by melting and bonding powders of the various plastics described above. The forms thereof include optional ones such as tabular bodies, fiber-converged bodies, sintered bodies and foamed bodies.

The shape of the pen tip comprising a fibrous feed or a plastic feed shall not specifically be restricted as long as it is a shape usually used for writing instruments.

Those having a porosity of 30 to 75% and a slit size of about 1 to 20 $\mu$m are preferred when a fibrous feed is used for the pen tip, and those having an average slit size of 20 to 40 $\mu$m are preferred when a plastic feed is used for the pen tip.

The porosity and the slit size each described above are varied according to the writing instruments of the respective types and therefore shall not be restricted to the value ranges described above.

Further, the slit size described above is calculated from the following equation:

slit size=porosity×(radius of yarn)/(1−porosity)

The coating agent comprising a substance providing a cap-off property is a substance which can inhibit the pen tip comprising a fibrous feed or a plastic feed from drying, and it shall not specifically be restricted as long as it has the characteristic that it is solid at room temperature (25° C., hereinafter the same shall apply) and that it has a solubility of 10% or less in an ink solvent at room temperature. It includes, for example, one or mixtures of two or more kinds selected from the group consisting of: glycerin derivatives such as diglycerin monostearate, triglycerin monostearate, pentaglycerin tristearate, hexaglycerin tristearate and decaglycerin distearate; alkylphosphoric acid esters such as polyoxyethylene-stearyl phosphate; polyoxyethylenesorbitan fatty acid esters such as polyoxyethylenesorbitan monostearate and polyoxyethylenesorbitan tristearate; polyoxyethylenesorbit fatty acid esters such as polyoxyethylenesorbit hexastearate; paraffin wax; microcrystalline wax; pentaerythritol derivatives such as pentaerythritol monostearate and pentaerythritol distearate; lecithin; saccharose esters; polyolefin wax; and ascorbic acid stearate.

Preferably, it is solid at room temperature and has a solubility of 10% or less in an ink solvent at room temperature. Further, from the viewpoint of making it difficult for the substance providing a cap-off property to be desorbed by physical friction of the pen tip caused by writing and by flow-out of the ink, those which are harder and have a lower solubility are preferred. Diglycerin monostearate, pentaglycerin tristearate, polyoxyethylenestearyl phosphate and lecithin are preferred because the durability and the effects are higher.

In the first invention of the present invention, a method for coating the fibrous feed or the plastic feed with the substance having the characteristics described above can be carried out by, for example, dissolving the substance having the characteristics described above in a solvent capable of dissolving the above substance, subjecting the fibrous feed or the plastic feed to dipping treatment in the solution or spraying treatment with it and then drying by heating or at room temperature. When the solubility is extremely low, the substance can be coated by dipping the feed in the heated solution and cooling it.

The solvents for dissolving the coating agent having the characteristics described above include, for example, alcohols such as methyl alcohol, ethyl alcohol, n-propyl alcohol and isopropyl alcohol, glycols such as ethylene glycol monomethyl ether, ethylene glycol monoethyl ether and propylene glycol monomethyl ether, ketones such as acetone and methyl ethyl ketone, esters such as methyl acetate, ethyl acetate, butyl acetate, ethylene glycol monomethyl ether acetate and propylene glycol monoethyl ether acetate, ethers such as dimethyl ether and diethyl ether, hydrocarbons such as hexane, isohexane, heptane and methylcyclohexane, and chlorinated compounds such as chloroform and methylene chloride.

An amount of the coating agent coated on the fibrous feed or the plastic feed is 0.01 to 20% by weight, preferably 0.1 to 10% by weight and more preferably 0.3 to 5% by weight in terms of a weight ratio based on the fibrous feed or the plastic feed.

If the coating amount is less than 0.01% by weight, the effects brought about by coating can not be achieved. On the other hand, if it exceeds 20% by weight, the substance having a vaporization-inhibiting function is coated too much on the fibrous feed or the plastic feed, and the functions which have to be exerted primarily by the fibrous feed or the plastic feed are damaged. Thus, the ink is less likely to be discharged, and starving is caused. Accordingly, neither of the amounts is preferred.

A colorant, a solvent, a resin which is soluble in the above solvent and the other additives for ink for a writing instrument as well as the fluorine base surfactant and/or the silicone base surfactant have to be added to the ink used in the first invention of the present invention.

The colorant includes oil-soluble dyes and pigments, and almost all of conventional oil-soluble dyes which can be dissolved in organic solvents can be used as the oil-soluble dyes.

The dyes include, for example, Orazol Yellow 2GLN, Orazol Red 3GL, Orazol Blue 2GLN, Neonzapon Blue FLE, Spirit Black SP, Valifast Red 1308, Oil Blue BA, Oil Yellow 185, Oil Red TR71, Oil Black S, Victoria Blue, Rhodamine 6JHSA and Flex Yellow 105, and the pigments shall not specifically be restricted and include, for example, organic pigments such as azo base pigments, condensed polyazo base pigments, phthalocyanine base pigments, metal complex salt pigments, thioindigo pigments, dye lake pigments and fluorescent pigments, and inorganic pigments such as carbon black and titanium oxide. Further, capable of being used as well are processed pigments the surfaces of which are processed by coating resins, for example, various Microlys A types, AS Black, AS Blue and IK Red. These dyes and/or pigments can be used alone or in a mixture of two or more kinds thereof. A use amount thereof varies depending on the kind of the colorant and the other ink components, and it is 1 to 30% by weight, preferably 2 to 15% by weight based on the total amount of the ink.

The solvent which can be used in the present invention includes, for example, lower alcohols such as ethyl alcohol, propyl alcohol and isopropyl alcohol, aromatic hydrocarbons such as toluene and xylene, lower aliphatic ketones such as methyl ethyl ketone and methyl isobutyl ketone, lower alcohol esters of lower fatty acids such as ethyl acetate and butyl acetate, aliphatic hydrocarbons such as hexane and heptane, alicyclic hydrocarbons such as cyclohexane and ethylcyclohexane and glycol ethers such as propylene glycol monomethyl ether.

These solvents each can be used alone or in a mixture of two or more kinds thereof. A use amount thereof is 50 to 95% by weight, preferably 70 to 85% by weight based on the total amount of the ink.

The resin which can be used in the present invention is used as a film-forming agent, a sticking agent onto a face to be coated, a viscosity-controlling agent for the ink and a dispersant for the colorant, and various natural resins and synthetic resins which have so far been used can be used. It includes, for example, rosin base resins such as rosin, ester gums, maleic acid-modified rosin and phenol-modified rosin, cellulose base resins such as ethyl cellulose and nitrocellulose, vinyl base resins such as polyvinylbutyral and vinyl chloride-vinyl acetate copolymer resins, petroleum base resins, ketone base resins, acryl base resins, condensation products of aldehyde and urea and a maleic acid resin. They can be used alone or in a mixture of two or more kinds thereof, and a use amount thereof is 0.1 to 30% by weight, preferably 1 to 20% by weight based on the total amount of the ink.

The other additives for a writing instrument include, for example, anionic, nonionic and cationic surfactants, preservatives, fungicides, rust preventives, lubricants and pH-controlling agents.

The fluorine base surfactant used in the first invention of the present invention includes, for example, perfluoroalkylsulfonates, perfluoroalkylcarboxylates, perfluoroalkyloxyethyleneethanols and fluorinated alkyl esters.

The silicone base surfactant includes, for example, dimethylsilicone, cyclic silicone, trimethylsiloxysilicic acid, methylphenylsilicone, polyether-modified silicone, methylstyryl-modified silicone, alkyl-modified silicone, higher fatty acid ester-modified silicone, higher alkoxy-modified silicone and fluorine-modified silicone.

They can be used alone or in a mixture of two or more kinds thereof.

When alcohols are used as the solvent, among the above surfactants, fluorinated alkyl esters and polyether-modified silicone which have a suitable solubility are preferred from the viewpoint of reducing a surface tension of the ink.

The fluorine base surfactant and/or the silicone base surfactant added to the ink have a content of 0.005 to 10% by weight, preferably 0.01 to 5% by weight based on the total amount of the ink composition.

If this content is less than 0.005% by weight, the wetting property and the ink discharge property can not be improved. On the other hand, if it exceeds 10% by weight, the film forming-ability brought about by the coating substance is weakened, and the non-drying property can not be secured.

In the writing instrument of the first invention thus constituted, the fibrous feed or the plastic feed is coated with the substance providing a cap-off property described above, that is, the coating agent which is solid at room temperature and has a solubility of 10% or less in the ink solvent at room temperature, whereby a very fragile film can be formed on the surface part of the fibrous feed or the plastic feed, and this film prevents the solvent, which is a volatile component contained in the ink, from vaporizing. The above film is broken by writing pressure in writing to allow a pen to write. Further, the substance providing a cap-off property coated on the fibrous feed or the plastic feed of the pen tip is dissolved again in the ink only by a required amount, though the dissolved amount is a little different depending on the coated amount described above, and then a new film is formed on the pen tip surface by virtue of interaction with the ink solvent when the pen tip is exposed to the air next time. The coating agent makes it possible to repeat this film formation → writing → film formation → writing - - - many times, that is, forms a film which is always reproduced at the pen tip and broken in writing. This effect shall be repeated until the ink filled in the ink tank part or occluded in the ink reservoir is exhausted.

On the other hand, the fluorine base surfactant and/or the silicone base surfactant added to the ink effectively work against the problems that the wetting property of the ink with respect to the pen tip is deteriorated and it takes time until the pen tip is filled with the ink when using paraffin wax among the substances providing a cap-off property, and the problems that starving is caused a little and the ink discharge amount is reduced. This provides a writing instrument having an excellent cap-off performance in which a pen tip is quickly filled with an ink to prevent starving from being caused and which has a stable ink discharge amount and achieves a good writing performance even after the pen tip is left to stand in the air over a long period of time.

Next, the writing instrument of the second invention of the present invention having an excellent cap-off performance is a writing instrument in which a pen tip comprising a fibrous feed or a plastic feed is coated with the coating agent comprising the substance providing a cap-off property, and it is characterized in that the coating agent described above contains a substance having a polar functional group which is solid at room temperature and which has a solubility of 5% or less in an ink solvent at room temperature.

The coating agent used in the second invention of the present invention contains the substance providing the pen tip comprising a fibrous feed or a plastic feed with a cap-off property and the substance having a polar functional group which is solid at room temperature and which has a solubility of 5% or less in an ink solvent at room temperature. In the present invention, even if the total amount of the coating agent is constituted from the substance having a polar functional group which is solid at room temperature and which has a solubility of 5% or less in an ink solvent at room temperature, the pen tip comprising a fibrous feed or a plastic feed can be inhibited from drying without having such damages of the writing performances as reduction in the ink discharge amount.

The substance providing a cap-off property in the second invention of the present invention is a substance which can inhibit drying of the pen tip comprising a fibrous feed or a plastic feed, and it shall not specifically be restricted as long as it has the characteristic in that it is solid at room temperature (25° C., hereinafter the same shall apply) and that it has a solubility of 10% or less in an ink solvent at room temperature. It includes one or mixtures of two or more kinds selected from the group consisting of: glycerin derivatives such as diglycerin monostearate, triglycerin monostearate, pentaglycerin tristearate, hexaglycerin tristearate and decaglycerin distearate; alkylphosphoric acid esters such as polyoxyethylenestearyl phosphate; polyoxyethylenesorbitan fatty acid esters such as polyoxyethylenesorbitan monostearate and polyoxyethylenesorbitan tristearate; polyoxyethylenesorbit fatty acid esters such as polyoxyethylenesorbit hexastearate; paraffin wax; microcrystalline wax; pentaerythritol derivatives such as pentaerythritol monostearate and pentaerythritol distearate; lecithin; saccharose esters; polyolefin wax and ascorbic acid stearate, which have been listed as the examples in the first invention of the present invention.

Preferably, it is solid at room temperature and has a solubility of 10% or less in an ink solvent at room temperature. Further, from the viewpoint of making it difficult for the substance providing a cap-off property to be desorbed by physical friction of the pen tip caused by writing and by flow-out of the ink, those which are harder and have a lower solubility are preferred. Those having a melting point of 40° C. or higher and a slight tackiness to the pen feed, for example, hexaglycerin tristearate, paraffin wax and microcrystalline wax are preferred because the durability and the effects are elevated.

The substance having a polar functional group used in the second invention of the present invention is a substance having a polar functional group, for example, a polar functional group such as a hydroxyl group, an ester group, an amino group, an ether group, a carbonyl group and an amide group in a molecule of an organic compound. It is solid at room temperature and has a solubility of 5% or less in an ink solvent at room temperature, and it has a suitable compatibility with the substance providing a cap-off property.

Such substance having a polar functional group includes at least one selected from the group consisting of oxidized paraffin, urethane type waxes and alcohol type waxes each having a polar functional group.

To be specific, it includes oxidized paraffin NPS-8070 (polar functional group: ester group), urethane type waxes NPS-6010 (polar functional group: urethane group), NPS-6115 (polar functional group: urethane group), HAD-5090 (polar functional group: urethane group) and HAD-5080 (polar functional group: urethane group) and alcohol type waxes NPS-9035 (polar functional group: hydroxyl group), NPS-9125 (polar functional group: hydroxyl group) and NPS-9210 (polar functional group: hydroxyl group) (all manufactured by Nippon Seiro Co., Ltd.), and they can be used alone or in combination of two or more kinds thereof.

Preferably used are urethane type waxes NPS-6010 and HAD-5090 and alcohol type wax NPS-9125, which improve an ink wetting property with respect to the pen feed through combined use thereof.

These substances having a polar functional group can inhibit the pen tip comprising a fibrous feed or a plastic feed from drying and have an excellent function of improving deterioration in a wetting property of the ink with respect to the pen tip and reduction in the ink discharge amount which are observed when using the substance providing a cap-off property but having no polar functional group such as paraffin wax and the like described above.

An amount of the coating agent coated on the fibrous feed or the plastic feed is 0.01 to 20% by weight, preferably 0.1 to 10% by weight and more preferably 0.3 to 5% by weight in terms of a weight ratio based on the fibrous feed or the plastic feed.

The substance having a polar functional group described above has a content of 0.01% by weight or more, preferably 0.05 to 100% by weight based on the total amount of the coating agent.

If the substance having a polar functional group described above has a content of less than 0.01% by weight, brought about are the problems of deterioration in a wetting property of the ink with respect to the pen tip and reduction in the ink discharge amount, and therefore it is not preferred.

In the second invention of the present invention, even if the substance having a polar functional group with the characteristics described above has a content of 100% by weight, that is, the total amount of the coating agent is constituted from the substance having a polar functional group with the characteristics described above, the pen tip comprising a fibrous feed or a plastic feed can be inhibited from drying without having such damages of the writing performances as reduction in the ink discharge amount.

In the second invention of the present invention, a method for coating the fibrous feed or the plastic feed with the coating agent comprising the substance having a polar functional group with the characteristics described above is the same as in the first invention. That is, the coating method, a solvent dissolving the above coating agent and the value limits and significance thereof are the same as in the first invention.

A colorant, a solvent, a resin which is soluble in the above solvent and the other additives for an ink for a writing instrument can be used as the ink components used in the second invention of the present invention, and these components also are the same as those used in the first invention described above.

In the writing instrument of the second invention thus constituted, the fibrous feed or the plastic feed is coated with the coating agent comprising the substance providing a cap-off property described above and the substance having a polar functional group with the characteristics described above or the coating agent in which the total amount thereof comprises the substance having a polar functional group with the characteristics described above, whereby a very fragile film can be formed on the surface part of the fibrous feed or the plastic feed, and this film prevents the solvent, which is a volatile component contained in the ink from vaporizing. The above film is broken by writing pressure in writing to make it possible to write. Further, the substance providing a cap-off property coated on the fibrous feed or the plastic feed of the pen tip is dissolved again in the ink only by a required amount, though the dissolved amount is a little different depending on the coating amount described above, and then a new film is formed on the pen tip surface by virtue of interaction with the ink solvent, when the pen tip is exposed to the air next time. The coating agent makes it possible to repeat this film formation → writing → film formation → writing - - - many times, that is, forms a film which is always reproduced at the pen tip and broken in writing. This effect shall be repeated until the ink filled in the ink tank part or occluded in the ink reservoir is exhausted.

On the other hand, when using the substance having no polar functional group such as paraffin wax and the like described above among the substances providing a cap-off property, the low critical surface tension thereof deteriorates slightly a wetting property of the ink with respect to the pen tip to cause the problem of reduction in the ink discharge amount. In the second invention of the present invention, however, the substance having a polar functional group with the characteristics described above is contained therein, and therefore provided is a writing instrument having an excellent cap-off performance in which a pen tip is quickly filled with an ink and which has a stable ink discharge amount without causing starving and achieves a good writing performance even after the pen tip is left to stand in the air over a long period of time.

It is a matter of course that the writing instrument of the present invention (the first invention and the second invention) shall not be restricted to the embodiments described above and can be changed to various embodiments as long as the scope of the present invention is not changed. It can be applied to, for example, an applicator for cosmetics and the like.

Further, the present invention may involve an embodiment in which the first invention and the second invention of the present invention are used in combination, that is, a writing instrument having much superior cap-off performance in which a pen tip comprising a fibrous feed or a plastic feed is coated with the coating agent comprising the substance providing a cap-off property, wherein the coating agent described above contains the substance having a polar functional group which is solid at room temperature and which has a solubility of 5% or less in an ink solvent at room temperature, and the fluorine base surfactant and/or the silicone base surfactant are added to an ink for the writing instrument described above.

Further, the present invention (the first invention and the second invention) is effective as well for writing instruments in which not only a pen tip comprising a fibrous feed or a plastic feed but also a feed and an ink reservoir are coated with a coating agent.

EXAMPLES

Next, the present invention (the first invention and the second invention) shall specifically be explained in details with reference to examples and comparative examples, but the present invention shall not be restricted to the following examples.

Examples 1 to 3 and Comparative Example 1 (The Examples and the Comparative Example in the First Invention)

| | |
|---|---|
| Propylene glycol monomethyl ether | 69.99% by weight |
| Ethanol | 10.00% by weight |
| Dye: Valifast Black #3830 | 10.00% by weight |
| (manufactured by Orient Chemical Industries, Ltd.) | |
| Resin: Hitanol 2500 | 10.00% by weight |
| (manufactured by Hitachi Chemical Co., Ltd.) | |
| Fluorine base surfactant: | 0.01% by weight |
| Florade FC431 (manufactured by Sumitomo 3M Limited) | |

The components described above were stirred by a conventional method to obtain a black ink composition.

Used as a pen feed was a feed comprising a sliver of an acryl fiber and having a weight of 0.17 g, a length of 33 mm and a diameter of 4.0 mm (porosity: 55%).

Paraffin wax ("Paraffin 135F" manufactured by Nippon Seiro Co., Ltd.) was used as the substance providing a cap-off property.

Paraffin wax described above had a solubility of 0.2% in an ink solvent (a solvent comprising propylene glycol monomethyl ether and ethanol) at room temperature.

In respect to a coating method, the coating substance was dissolved in isohexane, which was a solvent, to prepare a 4% solution, and the acryl pen feed described above was dipped in the solution prepared and continued to be dipped at 50° C. for 2 hours. Then, the feed was pulled up and put on a mesh-like vessel, and it was dried at 50° C. for a whole day and night (24 hours) to remove the solvent and then used.

An amount of the coating agent adhered on the acryl pen feed was shown by a difference in a weight of the pen feed before and after the treatment, and showing it by a weight % based on the weight of the pen feed before the treatment, it was 4% by weight.

The ink (4.5 g) and the pen feed each described above were used to obtain a writing instrument (marking pen) of a sliver type shown in FIG. 3.

Example 2

| | |
|---|---|
| Propylene glycol monomethyl ether | 69.50% by weight |
| Ethanol | 10.00% by weight |
| Valifast Black #3830 | 10.00% by weight |
| (manufactured by Orient Chemical Industries, Ltd.) | |
| Hitanol 2500 | 10.00% by weight |
| (manufactured by Hitachi Chemical Co., Ltd.) | |
| Silicone base surfactant: | 0.50% by weight |
| (modified silicone KP316: manufactured by Shin-etsu Chemical Co., Ltd.) | |

The components described above were stirred by a conventional method to obtain a black ink composition.

The same pen feed and writing instrument as used in Example 1 described above were used.

Example 3

| | |
|---|---|
| Propylene glycol monomethyl ether | 69.97% by weight |
| Ethanol | 10.00% by weight |
| Valifast Black #3830 | 10.00% by weight |
| (manufactured by Orient Chemical Industries, Ltd.) | |
| Hitanol 2500 | 10.00% by weight |
| (manufactured by Hitachi Chemical Co., Ltd.) | |
| Fluorine base surfactant: | 0.01% by weight |
| Florade FC431 (manufactured by Sumitomo 3M Limited) | |
| Silicone base surfactant: | 0.02% by weight |
| (modified silicone KP316: manufactured by Shin-etsu Chemical Co., Ltd.) | |

The components described above were stirred by a conventional method to obtain a black ink composition.

The same pen feed and the writing instrument as used in Example 1 described above were used.

Comparative Example 1

The same components (provided that propylene glycol monomethyl ether was controlled to 70.00% by weight) as used in Example 1 described above were used, except that the fluorine base surfactant (Florade FC431) was excluded in the ink composition of Example 1.

The writing instruments prepared in Examples 1 to 3 and Comparative Example 1 were used to evaluate an ink discharge amount and a cap-off performance by the following methods.

The results thereof are shown in the following Table 1.

Evaluation method for ink discharge amount

The marking pen described above was used to write 50 m on paper by means of a writing test machine, and the ink discharge amount discharged was measured.

Evaluation method for cap-off performance

The marking pen described above was left to stand at a temperature of 25° C. and a humidity of 65% for 2 weeks in a room with a cap off, and then the writing property was evaluated according to the following evaluation criteria.

Evaluation criteria:
◎: writable without starving
○: slightly starving at the beginning of writing
Δ: starving in the first line
×: impossible to write

TABLE 1

| | Ink discharge amount (mg/50 m) | Cap-off performance |
|---|---|---|
| Example 1 | 530 | ◎ |
| Example 2 | 510 | ○ |
| Example 3 | 530 | ○ |
| Comparative Example 1 | 340 | Δ |

As apparent from the results shown in Table 1, it has been found that the writing instruments prepared in Examples 1 to 3 falling in the range of the present invention are writing instruments having an excellent cap-off performance in which a pen tip is quickly filled with an ink and starving is not caused and which does not cause reduction in an ink discharge amount and provides a good writing performance even after the pen tip is left to stand in the air over a long period of time as compared with the writing instrument prepared in Comparative Example 1 falling outside the range of the present invention.

Examples 4 to 7 and Comparative Examples 2 to 3 (The Examples and the Comparative Example in the Second Invention)

Used as a pen tip was a pen feed comprising a sliver of an acryl fiber and having a weight of 0.17 g, a length of 33 mm and a diameter of 4.0 mm (porosity: 55%).

Normal paraffin (125F, melting point: 53° C., manufactured by Nippon Seiro Co., Ltd.) was used as the substance providing a cap-off property. Further, urethane type wax (HAD5090, manufactured by Nippon Seiro Co., Ltd.) was used as the substance having a polar functional group.

Normal paraffin had a solubility of 0.2% in an ink solvent (a solvent comprising n-propyl alcohol and propylene glycol monomethyl ether) at room temperature, and the urethane type wax described above had a solubility of 0.1% or less.

With respect to a coating method, the coating agent (the substance providing a cap-off property and the substance having a polar functional group described above) was dissolved in methylene chloride, which was a solvent, to prepare a 4% solution, and the pen feed described above was dipped in the solution prepared and continued to be dipped at 50° C. for 2 hours. Then, the feed was pulled up and put on a mesh-like vessel, and it was dried at 50° C. for a whole day and night (24 hours) to remove the solvent and then used.

An amount of the coating agent adhered on the pen tip was shown by a difference in a weight of the ink reservoir before and after the treatment and shown by a weight % based on the weight of the pen feed before the treatment. The pen tips having the adhered amounts shown in the following Table 2 were used.

Used was an ink (the total amount: 100% by weight) comprising a composition shown below. Used in Example 7 was an ink prepared by further blending the ink having the composition shown below with 0.1% by weight of a silicone base surfactant (modified silicone KP-316: manufactured by Shin-etsu Chemical Co., Ltd.) (provided that propylene glycol monomethyl ether was controlled to 69.9% by weight with the whole amount being 100% by weight).

| Composition of the ink: | |
|---|---|
| Solvent: n-propyl alcohol | 14.0% by weight |
| Solvent: propylene glycol monomethyl ether | 70.0% by weight |
| Resin: Laropearl A101 (manufactured by BASF) (condensation product of aldehyde and urea) | 12.0% by weight |
| Dye: Victoria Blue BSA (manufactured by Zeneca Co., Ltd.) | 3.0% by weight |
| Dye: Rhodamine 6JHSA (manufactured by Zeneca Co., Ltd.) | 1.0% by weight |

The ink (4.5 g) and the pen feed each described above were used to obtain a writing instrument (marking pen) of a sliver type shown in FIG. 3.

The respective writing instruments were used to evaluate an ink discharge amount and a cap-off performance by the following methods.

The results thereof are shown in the following Table 2.

Evaluation Method for Cap-off Performance

Evaluated by the same method as in Examples 1 to 3.

Evaluation Method for ink Discharge Amount

The marking pen described above was used to write 100 m on paper by means of a writing test machine, and the ink discharge amount discharged was measured.

TABLE 2

|  | Kind of pen feed | Cap-off performance | Ink discharge amount (g/100 m) |
|---|---|---|---|
| Example 4 | A | ◎ | 0.80 |
| Example 5 | B | ○ | 0.85 |
| Example 6 | C | ◎ | 0.72 |
| Example 7 | C | ◎ | 0.82 |
| Comparative Example 2 | Un-treated | X | 1.00 |
| Comparative Example 3 | D | ○ | 0.62 |

Kind of pen feed:
- A: fibrous feed having an adhered amount of 2%, Coating agent (mixed type) [125F (1.5% by weight) +HAD-5090 (0.5% by weight)]
- B: fibrous feed having an adhered amount of 2%, Coating agent (single type) [HAD-5090 (2% by weight)]
- C: fibrous feed having an adhered amount of 5%, Coating agent (mixed type) [125F (4% by weight) +HAD-5090 (1% by weight)]
- D: fibrous feed having an adhered amount of 2%, 0 Coating agent (single type) [normal paraffin 125F (2% by weight)]

As apparent from the results shown in Table 2, it has been found that the writing instruments prepared in Examples 4 to 7 falling in the range of the present invention are writing instruments having an excellent cap-off performance in which a pen tip is quickly filled with an ink and starving is not caused and which does not cause reduction in an ink discharge amount and provides a good writing performance even after the pen tip is left to stand in the air over a long period of time as compared with the writing instruments prepared in Comparative Examples 2 to 3 falling outside the range of the present invention.

INDUSTRIAL APPLICABILITY

The writing instrument of the present invention is suited to a writing instrument in which an ink is penetrated into a pen tip comprising a fibrous feed or a plastic feed, such as a marking pen, a felt-tip pen and a writing brush pen.

What is claimed is:

1. A writing instrument having an excellent cap-off performance in which a pen tip comprising a fibrous feed or a plastic feed is coated with a coating agent comprising a substance providing a cap-off property and which is solid at room temperature and has a solubility of 10% or less in an ink solvent at room temperature, and wherein an ink for the writing instrument contains an agent for improving a wetting property of the pen tip comprising at least one of a fluorine base surfactant and a silicone base surfactant.

2. A writing instrument having an excellent cap-off performance in which a pen tip comprising a fibrous feed or a plastic feed is coated with a coating agent comprising a substance providing a cap-off property, and wherein the coating agent contains a substance which is solid at room temperature and has a solubility of 10% or less in an ink solvent at room temperature, and an agent for improving a wetting property of the pen tip comprising a substance which is solid at room temperature and has a solubility of 5% or less in an ink solvent at room temperature and which has a polar functional group.

3. The writing instrument having an excellent cap-off performance as described in claim 2, wherein an ink for the writing instrument contains an agent for improving a wetting property of the pen tip comprising at least one of a fluorine base surfactant and a silicone base surfactant.

4. The writing instrument having an excellent cap-off performance as described in claim 3, wherein the agent for improving a wetting property of the pen tip comprising the substance having a polar functional group is at least one selected from the group consisting of oxidized paraffin, urethane type waxes and alcohol type waxes.

5. The writing instrument having an excellent cap-off performance as described in claim 4, wherein the agent for improving a wetting property of the pen tip comprising the substance having a polar functional group has a content of 0.01% by weight or more based on the total amount of the coating agent.

6. The writing instrument having an excellent cap-off performance as described in claim 3, wherein the agent for improving a wetting property of the pen tip comprising the substance having a polar functional group has a content of 0.01% by weight or more based on the total amount of the coating agent.

7. The writing instrument having an excellent cap-off performance as described in claim 2, wherein the agent for improving a wetting property of the pen tip comprising the substance having a polar functional group is at least one selected from the group consisting of oxidized paraffin, urethane type waxes and alcohol type waxes.

8. The writing instrument having an excellent cap-off performance as described in claim 7, wherein the agent for improving a wetting property of the pen tip comprising the substance having a polar functional group has a content of 0.01% by weight or more based on the total amount of the coating agent.

9. The writing instrument having an excellent cap-off performance as described in claim 2, wherein the agent for improving a wetting property of the pen tip comprising the substance having a polar functional group has a content of 0.01% by weight or more based on the total amount of the coating agent.

* * * * *